Sept. 2, 1924.　　　　　　　　　　　　　　　1,507,206
J. W. SANDERS
PEDAL PIN
Filed March 29, 1922
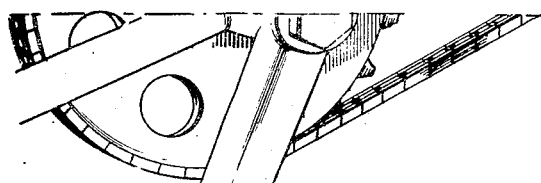
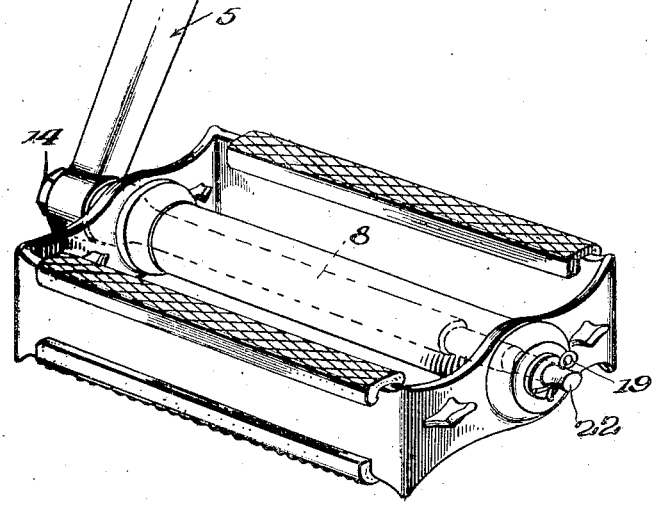
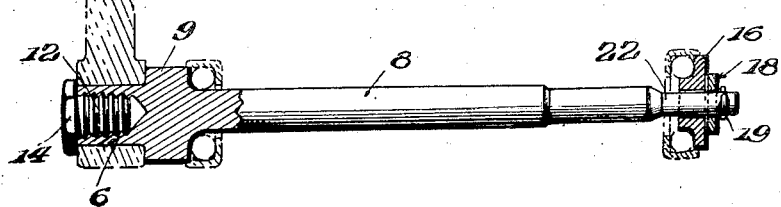
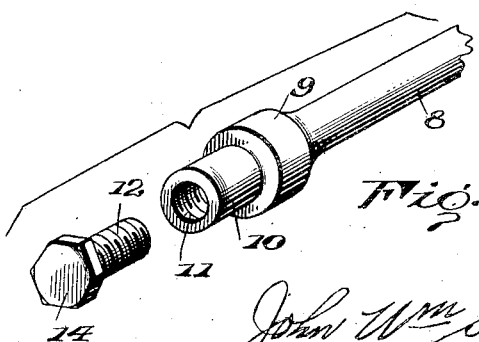
INVENTOR
John Wm Sanders Patented Sept. 2, 1924.

1,507,206

UNITED STATES PATENT OFFICE.

JOHN WM. SANDERS, OF LORAIN, OHIO.

PEDAL PIN.

Application filed March 29, 1922. Serial No. 547,717.

*To all whom it may concern:*

Be it known that I, JOHN W. SANDERS, a citizen of the United States, residing at Lorain, in the county of Lorain and State of Ohio, have invented certain new and useful Improvements in Pedal Pins, of which the following is a specification.

This invention relates to pedal pins especially adapted for use on bicycles, motorcycles and the like.

An important object of this invention is to provide a pedal pin having simple and reliable means whereby the same may be attached to a pedal arm in which the threads have been stripped or mutilated.

A further object is to provide a pedal pin of the class described having simple means whereby to hold the cone of the ball-bearing in position in such a manner that the cone is prevented from binding and thereby preventing the pedal pin from freely rotating.

A further object is to provide a pedal pin which is of highly simplified construction, simple to apply and cheap to manufacture.

Other objects and advantages of the invention will be apparent during the course of the following description.

In the accompanying drawing forming a part of this application and in which like numerals are employed to designate like parts throughout the same, Figure 1 is a perspective of a pedal equipped with the improved pedal pin.

Figure 2 is a side elevation of the improved pedal pin applied, parts being shown in section.

Figure 3 is a fragmentary perspective of the improved pedal pin.

In the drawing wherein for the purpose of illustration is shown a preferred embodiment of the invention, the numeral 5 generally designates a pedal arm or crank having its lower portion slightly enlarged and formed with an opening 6 which in manufacture is screw threaded. However the screw threads of the opening 6 sometimes become worn or mutilated and in that case the pedal pin forming the subject matter of this application is employed.

The improved pedal pin is designated by the numeral 8 and has one end portion formed with an annular shoulder 9 adapted to contact with one side of the crank 5. The pedal pin 8 is perfectly smooth beyond the shoulder 9 to provide an attaching portion 10 adapted to be received within the opening 6. The attaching portion 10 is as illustrated in Figure 3 hollow and interiorly screw threaded as indicated at 11 for the reception of a screw bolt 12. The screw bolt 12 is provided with a head 14 adapted to flatly contact with the inner side of the crank 5 whereby to hold the pedal pin in position.

In operation it will be seen that the pedal pin 8 may be readily and conveniently applied to the crank arm 5 without the necessity of renewing the screw threads in the opening 6. When applied the pedal pin is securely and positively held in position.

The cone 16 of the ball bearings may be detachably held in position by means of a washer 18 and cotter key 19 or a similar fastening device. The cotter pin or key 19 and the washer 18 hold the cone 16 in position and do not cause the same to bind as is the case of the nuts now employed. In carrying out the invention the terminal portion 22 of the pin 8 may be made perfectly smooth.

With reference to the foregoing description taken in connection with the accompanying drawing it will be observed that a pedal pin constructed in accordance with this invention may be economically manufactured and conveniently applied to a pedal arm.

Having thus described the invention, what is claimed is:—

A device of the character described comprising a crank arm having an opening in one end thereof, a pedal pin one end thereof extending through said opening in said crank arm, an annular shoulder formed on said pedal pin engaging one side of said crank arm adjacent said opening, said pedal pin having a threaded opening extending centrally in the end thereof received in said opening in said crank arm, and a headed bolt threaded in said opening in said pedal pin the head thereof engaging the opposite side of said crank arm from that engaged by said shoulder.

In testimony whereof, I have affixed my signature in the presence of three witnesses.

JOHN WM. SANDERS.

Witnesses:
C. W. DAVIS,
LEON S. HAWLEY,
THOMAS A. KERNEN.